US009677556B2

(12) United States Patent
Worden et al.

(10) Patent No.: US 9,677,556 B2
(45) Date of Patent: Jun. 13, 2017

(54) SYSTEM AND METHOD FOR A COMPRESSOR

(71) Applicant: GENERAL ELECTRIC COMPANY, Schenectady, NY (US)

(72) Inventors: Bret Dwayne Worden, Erie, PA (US); Richard C. Peoples, Grove City, PA (US); David E. Peterson, Lawrence Park, PA (US); Jason M. Strode, Lawrence Park, PA (US); Neil W. Burkell, Lawrence Park, PA (US); Milan Karunaratne, Lawrence Park, PA (US)

(73) Assignee: General Electric Company, Schenectady, NY (US)

( * ) Notice: Subject to any disclaimer, the term of this patent is extended or adjusted under 35 U.S.C. 154(b) by 657 days.

(21) Appl. No.: 13/866,670

(22) Filed: Apr. 19, 2013

(65) Prior Publication Data

US 2013/0294938 A1    Nov. 7, 2013

Related U.S. Application Data

(60) Provisional application No. 61/636,192, filed on Apr. 20, 2012.

(51) Int. Cl.
F04B 49/06 (2006.01)
F04B 25/00 (2006.01)
F04B 49/02 (2006.01)

(52) U.S. Cl.
CPC ............ *F04B 49/065* (2013.01); *F04B 25/00* (2013.01); *F04B 49/02* (2013.01)

(58) Field of Classification Search
CPC ........ F04B 17/05; F04B 49/02; F04B 49/065; F04B 49/06; F04B 25/00; F04B 25/005

(Continued)

(56) References Cited

U.S. PATENT DOCUMENTS 2,738,659 A    3/1956  Heed
3,216,648 A    11/1965 Ford
(Continued)

FOREIGN PATENT DOCUMENTS

CN    1227918 A    9/1999
CN    2351587 Y    12/1999
(Continued)

OTHER PUBLICATIONS

PCT Search Report and Written opinion of Application No. PCT/US2012/053520 dated Dec. 17, 2012.
(Continued)

*Primary Examiner* — Devon Kramer
*Assistant Examiner* — Kenneth J Hansen
(74) *Attorney, Agent, or Firm* — Global Patent Operation; John A. Kramer

(57) ABSTRACT

Systems and methods of the invention relate to diagnosing a compressor. A method may include operating a compressor to compress air from a first stage compressor into an intermediate stage reservoir, to deliver air from the intermediate stage reservoir to a second stage compressor, and to further compress the air in the second stage compressor into a primary reservoir, monitoring an intermediate stage pressure of the intermediate stage reservoir, and identifying a condition of the compressor through recognition of a change in the monitored intermediate stage pressure during a time period in which the compressor is operated. A vehicle system is also provided including an engine, a compressor operatively connected to the engine, and a controller that is operable to identify a condition of the compressor.

23 Claims, 4 Drawing Sheets

(58) Field of Classification Search
USPC .......... 417/12, 13, 18, 22, 253, 255, 53, 252
See application file for complete search history.

(56) References Cited

U.S. PATENT DOCUMENTS

| | | | |
|---|---|---|---|
| 3,299,825 | A | 1/1967 | Phiystein |
| 3,592,563 | A | 7/1971 | Glass et al. |
| 3,855,509 | A | 12/1974 | Wright |
| 4,112,703 | A | 9/1978 | Kountz |
| 4,216,672 | A | 8/1980 | Henry et al. |
| 4,216,915 | A | 8/1980 | Hengartner et al. |
| 4,248,053 | A | 2/1981 | Sisk |
| 4,334,427 | A | 6/1982 | Armstrong |
| 4,653,986 | A | 3/1987 | Ashton |
| 4,687,982 | A | 8/1987 | Palaniappan |
| 5,000,664 | A | 3/1991 | Lawless et al. |
| 5,106,270 | A | 4/1992 | Goettel et al. |
| 5,112,196 | A | 5/1992 | Schuh |
| 5,471,400 | A | 11/1995 | Smalley et al. |
| 5,546,015 | A | 8/1996 | Okabe |
| 5,711,272 | A | 1/1998 | Maegawa et al. |
| 5,728,941 | A | 3/1998 | Yamamoto et al. |
| 5,785,081 | A | 7/1998 | Krawczyk et al. |
| 5,860,800 | A | 1/1999 | Kramer et al. |
| 5,883,489 | A | 3/1999 | Konrad |
| 5,885,060 | A | 3/1999 | Cunkelman et al. |
| 5,897,597 | A | 4/1999 | O'Daniel |
| 6,023,651 | A | 2/2000 | Nakayama et al. |
| 6,027,311 | A | 2/2000 | Hill et al. |
| 6,045,197 | A | 4/2000 | McGaugh |
| 6,062,825 | A | 5/2000 | Chovan |
| 6,098,412 | A | 8/2000 | Porter et al. |
| 6,132,177 | A | 10/2000 | Loprete et al. |
| 6,203,285 | B1* | 3/2001 | Wagner et al. ............... 417/243 |
| 6,305,313 | B1 | 10/2001 | Cunkelman et al. |
| 6,341,497 | B2 | 1/2002 | Herrick et al. |
| 6,390,779 | B1 | 5/2002 | Cunkelman |
| 6,510,731 | B2 | 1/2003 | Schricker et al. |
| 6,616,416 | B1 | 9/2003 | Tolbert, Jr. |
| 6,651,034 | B1 | 11/2003 | Hedlund et al. |
| 6,658,346 | B2 | 12/2003 | Maegawa |
| 6,679,689 | B2 | 1/2004 | Takahashi et al. |
| 6,968,268 | B2 | 11/2005 | Yamada et al. |
| 7,008,472 | B2 | 3/2006 | Fornof et al. |
| 7,031,850 | B2 | 4/2006 | Kambli et al. |
| 7,111,592 | B1 | 9/2006 | Kern et al. |
| 7,133,766 | B2 | 11/2006 | Kokubo |
| 7,153,106 | B2 | 12/2006 | Cornwell |
| 7,197,916 | B2 | 4/2007 | Matsumoto et al. |
| 7,216,552 | B2* | 5/2007 | Fogelstrom .............. 73/862.326 |
| 7,509,233 | B2 | 3/2009 | Pervaiz |
| 7,620,522 | B2* | 11/2009 | Bredau et al. ................ 702/183 |
| 7,761,223 | B2 | 7/2010 | Wang et al. |
| 8,147,211 | B2 | 4/2012 | Grant et al. |
| 8,696,335 | B2 | 4/2014 | Fujimoto et al. |
| 8,961,147 | B2 | 2/2015 | Van Campfort et al. |
| 9,109,517 | B2 | 8/2015 | Banerjee et al. |
| 2002/0050271 | A1 | 5/2002 | Hasegawa et al. |
| 2002/0051710 | A1 | 5/2002 | Yoo et al. |
| 2002/0159896 | A1 | 10/2002 | Finnamore et al. |
| 2003/0077179 | A1 | 4/2003 | Collins et al. |
| 2004/0079226 | A1 | 4/2004 | Barrett |
| 2004/0120825 | A1 | 6/2004 | Bouton et al. |
| 2004/0148926 | A1 | 8/2004 | Morinaga et al. |
| 2004/0167738 | A1 | 8/2004 | Miller |
| 2004/0193384 | A1 | 9/2004 | Edlund et al. |
| 2005/0204805 | A1 | 9/2005 | Wakahara et al. |
| 2006/0222515 | A1 | 10/2006 | Delmotte et al. |
| 2007/0000308 | A1 | 1/2007 | Weissgerber |
| 2007/0068181 | A1 | 3/2007 | Kim |
| 2007/0253838 | A1 | 11/2007 | Leiss |
| 2008/0022702 | A1 | 1/2008 | Fijas et al. |
| 2008/0257532 | A1 | 10/2008 | Fijas et al. |
| 2009/0120174 | A1 | 5/2009 | Nodera et al. |
| 2009/0229355 | A1 | 9/2009 | Shoda |
| 2010/0106458 | A1 | 4/2010 | Leu et al. |
| 2010/0153027 | A1 | 6/2010 | Bredau et al. |
| 2010/0162797 | A1 | 7/2010 | Summers et al. |
| 2010/0211296 | A1 | 8/2010 | Saunders |
| 2010/0281843 | A1 | 11/2010 | Smith |
| 2010/0303658 | A1 | 12/2010 | Ito et al. |
| 2011/0046902 | A1 | 2/2011 | Kyllingstad |
| 2011/0056708 | A1 | 3/2011 | Gamble et al. |
| 2011/0213538 | A1 | 9/2011 | Amann et al. |
| 2012/0321486 | A1 | 12/2012 | Scarpinato et al. |

FOREIGN PATENT DOCUMENTS

| | | |
|---|---|---|
| CN | 1880936 A | 12/2006 |
| CN | 201358901 Y | 12/2009 |
| CN | 201439746 U | 4/2010 |
| DE | 10052664 A1 | 5/2002 |
| EP | 0522849 A1 | 1/1993 |
| EP | 1508736 A1 | 2/2005 |
| EP | 1947341 A1 | 7/2008 |
| GB | 658118 A | 10/1951 |
| JP | 2003021072 A | 1/2003 |
| KR | 100779192 B1 | 11/2007 |
| WO | 2006056214 A1 | 6/2006 |
| WO | 2007084140 A1 | 7/2007 |
| WO | 2008033677 A2 | 3/2008 |

OTHER PUBLICATIONS

Bearing Failure Detection on an Air Compressor Case History"downloaded from http://www.termogram.com/articulos/doc_download/3-case-study-azimadli-compresor-de-aire," date of publication uncertain, but possibly published no later than Jan. 12, 2010.

PCT Search Report and Written Opinion issued in connection with corresponding Application No. PCT/US2013037567 on Aug. 25, 2014.

Unofficial English Translation of Chinese Office Action issued in connection with related CN Application No. 201380032394.2 dated Feb. 2, 2016; 25 pages.

Unofficial English Translation of Chinese Office Action issued in connection with related CN Application No. 201280044852.X dated Apr. 22, 2015; 21 pages.

James et al.; Acoustical Oceanography and Underwater Acoustics: Acoustical Measurement of Coastal Ocean Processes I; The 133rd Meeting of the Acoustical Society of America; Jun. 1997; 34 pages.

International Search Report and Written Opinion for PCT Application No. PCT/US2013/036527 dated Aug. 25, 2014; 12 pages.

Final Office Action issued in connection with related U.S. Appl. No. 13/857,334 dated Jan. 14, 2016; 16 pages.

Final Office Action issued in connection with corresponding U.S. Appl. No. 13/866,573 dated Oct. 30, 2015; 11 pages.

Final Office Action issued in connection with corresponding U.S. Appl. No. 13/866,573 dated Dec. 31, 2015; 13 pages.

Notice of Allowance issued in connection with related U.S. Appl. No. 13/233,856 dated Nov. 21, 2014; 8 pages.

Non-Final Office Action issued in connection with related U.S. Appl. No. 13/866,573 dated Jun. 3, 2016; 22 pages.

Non-Final Office Action issued in connection with corresponding U.S. Appl. No. 13/866,573 dated May 7, 2015; 10 pages.

Non-Final Office Action issued in connection with related U.S. Appl. No. 13/857,334 dated Apr. 10, 2015; 13 pages.

Non-Final Office Action issued in connection with corresponding U.S. Appl. No. 13/866,499 dated Jul. 14, 2016; 14 pages.

Non-Final Office Action issued in connection with corresponding U.S. Appl. No. 13/866,435 dated Apr. 22, 2016; 10 pages.

Non-Final Office Action issued in connection with corresponding U.S. Appl. No. 13/866,471 dated Mar. 24, 2016; 8 pages.

Non-Final Office Action issued in connection with related U.S. Appl. No. 13/866,435 dated Mar. 26, 2015; 9 pages.

(56) References Cited

OTHER PUBLICATIONS

Non-Final Office Action issued in connection with related U.S. Appl. No. 13/956,426 dated Jul. 27, 2016; 14 pages.

* cited by examiner

SYSTEM AND METHOD FOR A COMPRESSOR

CROSS-REFERENCE TO RELATED APPLICATIONS

This application claims the benefit of U.S. Provisional Application Ser. No. 61/636,192, filed Apr. 20, 2012, and entitled "SYSTEM AND METHOD FOR A COMPRESSOR." The entirety of the aforementioned application is incorporated herein by reference.

BACKGROUND

Technical Field

Embodiments of the subject matter disclosed herein relate to compressor diagnostics.

Discussion of Art

Compressors compress gas, such as air. Compressors may be driven by electric motors, and may be air cooled. Some compressors include three cylinders with two stages. For example, a compressor can have two low pressure cylinders which deliver an intermediate pressure air supply to a single high pressure cylinder for further compression for final delivery to an air reservoir. Compressor and compressor components are subject to various failure modes, which increase difficulties in maintaining a healthy compressor.

It may be desirable to have a system and method that differs from those systems and methods that are currently available.

BRIEF DESCRIPTION

In an embodiment, a method for a compressor (e.g., a method for controlling and/or operating a compressor) is provided that includes the steps of operating a compressor to compress air from a first stage compressor into an intermediate stage reservoir, to deliver air from the intermediate stage reservoir to a second stage compressor, and to further compress the air in the second stage compressor into a primary reservoir. The method further comprises monitoring an intermediate stage pressure of the intermediate stage reservoir, and identifying a condition of the compressor through recognition of a change in the monitored intermediate stage pressure during a time period in which the compressor is operated. (In embodiments, the method is automatically or otherwise carried out by a controller.)

In an embodiment, a controller is provided that is operable in association with a compressor that includes a first stage compressor configured to compress air into an intermediate stage reservoir at a first pressure, and a second stage compressor configured to receive air from the intermediate stage compressor at the first pressure and further compress the air into a primary reservoir of the compressor at a second pressure; the second pressure is greater than the first pressure. In the embodiment, the controller can be configured to receive a signal corresponding to a monitored intermediate stage pressure of the intermediate stage reservoir of the compressor, and identify a condition of the compressor through recognition of a change in the monitored intermediate stage pressure during a time period in which the compressor is operated.

In an embodiment, a system comprises a compressor system having a first stage compressor configured to compress air into an intermediate stage reservoir at a first pressure, and a second stage compressor configured to receive air from the intermediate stage compressor at the first pressure and further compress the air into a primary reservoir of the compressor system at a second pressure; the second pressure is greater than the first pressure. The system further comprises a controller that is configured to receive a signal corresponding to a monitored intermediate stage pressure of the intermediate stage reservoir of the compressor system, and identify a condition of the compressor system through recognition of a change in the monitored intermediate stage pressure during a time period in which the compressor system is operated.

In an embodiment, a compressor system is provided that includes means for operating a compressor to compress air from a first stage compressor into an intermediate stage reservoir, to deliver air from the intermediate stage reservoir to a second stage compressor, and to further compress the air in the second stage compressor into a primary reservoir and means for monitoring an intermediate stage pressure of the intermediate stage reservoir. In the embodiment, the compressor system can include means for identifying a condition of the compressor through recognition of a change in the monitored intermediate stage pressure during a time period in which the compressor is operated.

BRIEF DESCRIPTION OF THE DRAWINGS

Reference is made to the accompanying drawings in which particular embodiments and further benefits of the invention are illustrated as described in more detail in the description below, in which.

DETAILED DESCRIPTION

Figure 1:
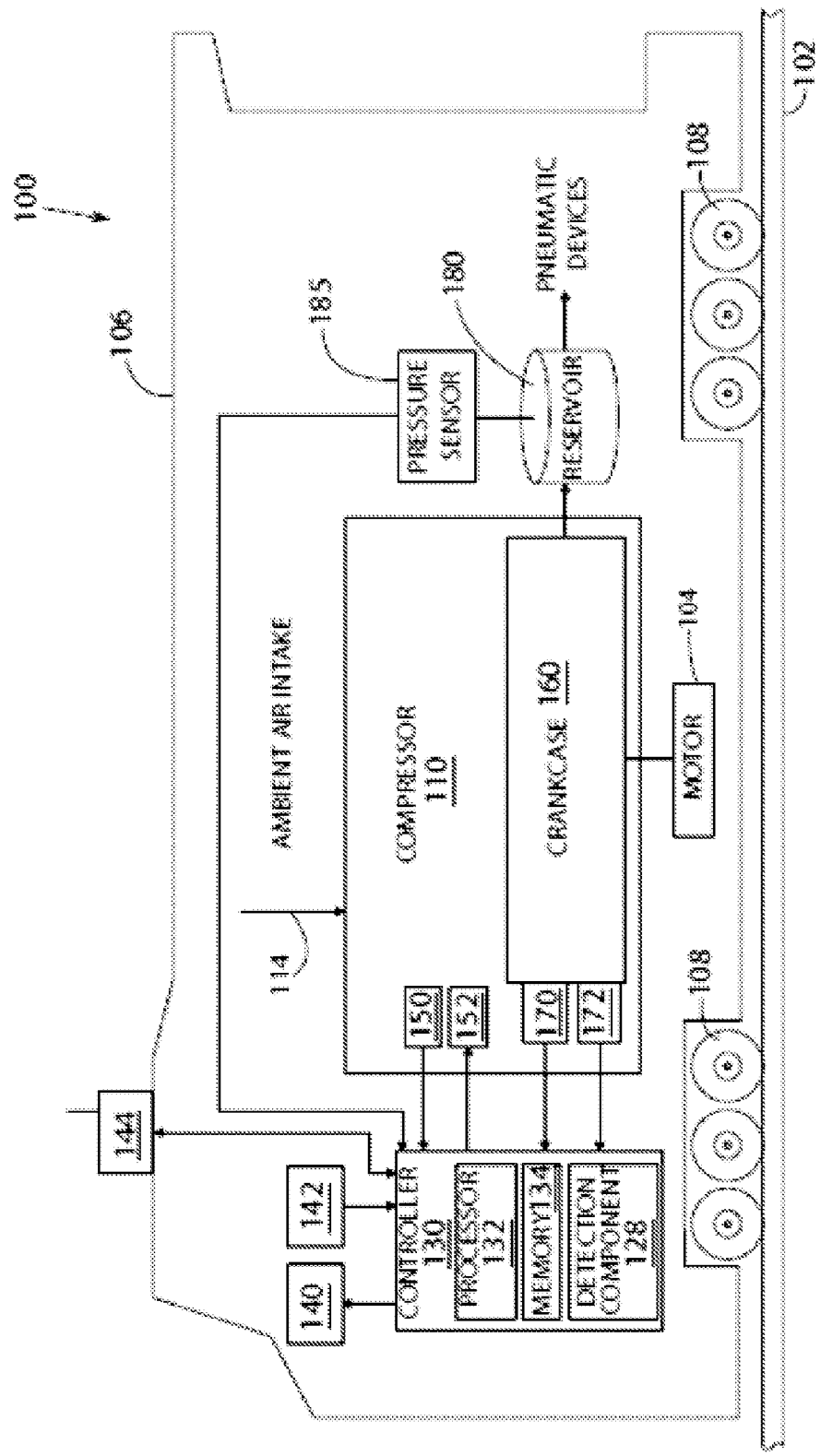
FIG. 1 is an illustration of an embodiment of a vehicle system with a compressor.

Embodiments of the subject matter disclosed herein relate to systems and methods that facilitate identifying a condition of a compressor and, in particular, identifying a condition of the compressor by monitoring a pressure of an intermediate stage. A controller can be configured to actuate a piston for a compressor while monitoring an intermediate stage pressure with the compressor. Moreover, a pressure sensor (e.g., also referred to as a detection component) can be configured to monitor pressure for the intermediate stage, for purposes of detecting a change (e.g., a fluctuation, increase, decrease, among others) in the pressure. Based upon a detected change in the monitored pressure of the intermediate stage, the controller can be configured to identify a condition of the compressor associated with the detected change in pressure. In an embodiment, the controller can be further configured to communicate an alert related to the detected change in the intermediate stage pressure and associate the change with a position of the piston. The alert can be a signal (e.g., diagnostic code, audio, text, visual, haptic, among others) that indicates a change in the monitored pressure of the intermediate stage of the compressor. This alert can be utilized to provide maintenance on the compressor or a portion thereof. In an embodiment, the controller can be configured to schedule a maintenance operation based upon the detected change in pressure of the intermediate stage and/or the communicated alert in order to perform preventative maintenance.

With reference to the drawings, like reference numerals designate identical or corresponding parts throughout the several views. However, the inclusion of like elements in different views does not mean a given embodiment necessarily includes such elements or that all embodiments of the invention include such elements.

The term "component" as used herein can be defined as a portion of hardware, a portion of software, or a combination thereof. A portion of hardware can include at least a processor and a portion of memory, wherein the memory includes an instruction to execute. The term "vehicle" as used herein can be defined as any asset that is a mobile machine that transports at least one of a person, people, or a cargo, or that is configured to be portable from one location to another. For instance, a vehicle can be, but is not limited to being, a locomotive or other rail vehicle, an intermodal container, a marine vessel, a mining equipment, a stationary portable power generation equipment, an industrial equipment, a construction equipment, and the like. The term "loaded" as used herein can be defined as a compressor system mode where air is being compressed into the reservoir. The term "loaded start" as used herein can be defined as a compressor system mode in a loaded condition during a starting phase of the compressor. The term "unloaded" as used herein can be defined as a compressor system mode where air is not being compressed into the reservoir.

A compressor compresses gas, such as air. In some embodiments, the compressed gas is supplied to operate pneumatic or other equipment powered by compressed gas. A compressor may be used for mobile applications, such as vehicles. By way of example, vehicles utilizing compressors include locomotives, on-highway vehicles, off-highway vehicles, mining equipment, and marine vessels. In other embodiments, a compressor may be used for stationary applications, such as in manufacturing or industrial applications requiring compressed air for pneumatic equipment among other uses. The compressor depicted in the below figures is one which utilizes spring return inlet and discharge valves for each cylinder, wherein the movement of these valves is caused by the differential pressure across each cylinder as opposed to a mechanical coupling to the compressor crank shaft. The subject invention can be applicable to machines with either type of valve (e.g., spring return valves, mechanical coupled valves, among others) and the spring return valve is depicted solely for example and not to be limiting on the subject innovation.

The components of a compressor may degrade over time resulting in performance reductions and/or eventual failure of a compressor. In vehicle applications, for example, a compressor failure may produce a road failure resulting in substantial costs to the vehicle owner or operator. In this context, a road failure includes a vehicle, such as a locomotive, becoming inoperative when deployed in service as a result of the failure or degradation of a compressor system that prevents operation or requires shutting down the vehicle until repairs can be made. Prior to a total failure, the detection of degraded components or other deterioration of the compressor may be used to identify incipient faults or other conditions indicative of deterioration. In response to detecting such conditions, remedial action may be taken to mitigate the risk of compressor failure and associated costs.

The systems and methods presently disclosed can also be used to diagnose and/or prognose problems in a compressor prior to total compressor failure. If deterioration or degradation of the compressor is detected in the system, action can be taken to reduce progression of the problem and/or further identify the developing problem. In this manner, customers realize a cost savings by prognosing compressor problems in initial stages to reduce the damage to compressor components and avoid compressor failure and unplanned shutdowns. Moreover, secondary damage to other compressor components (e.g., pistons, valves, liners, and the like) or damage to equipment that relies upon the availability of the compressed gas from the compressor may be avoided if compressor problems are detected and addressed at an early stage.

Figure 2:
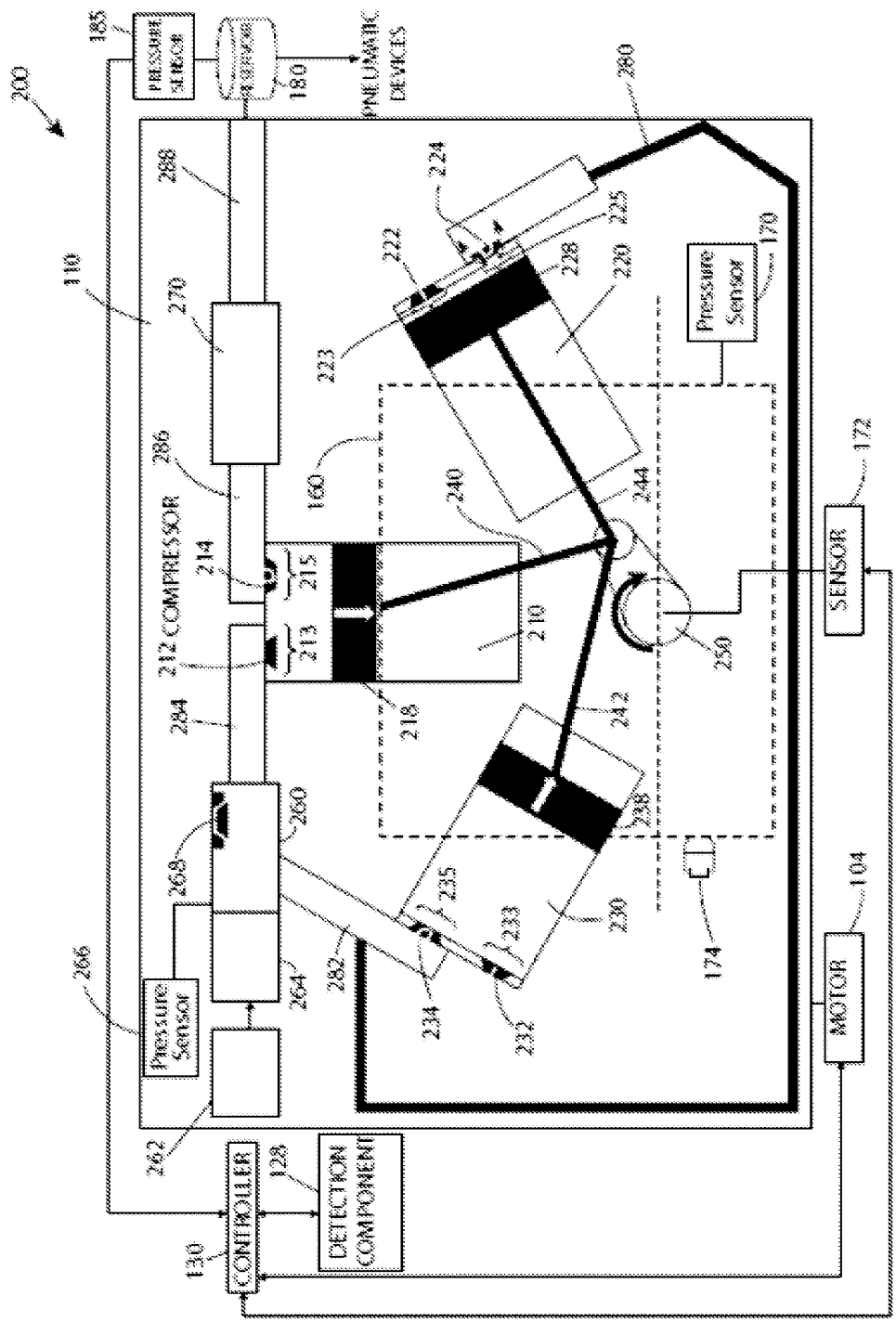
FIG. 2 is an illustration of an embodiment of system that includes a compressor.

FIG. 1 illustrates a block diagram of an embodiment of a vehicle system 100. The vehicle system 100 is depicted as a rail vehicle 106 (e.g., locomotive) configured to run on a rail 102 via a plurality of wheels 108. The rail vehicle includes a compressor system with a compressor 110. In an embodiment, the compressor is a reciprocating compressor that delivers air at high pressure. In another embodiment, the compressor is a reciprocating compressor with a bi-directional drive system that drives a piston in a forward direction and the reverse direction. In an embodiment, the compressor receives air from an ambient air intake 114. The air is then compressed to a pressure greater than the ambient pressure and the compressed air is stored in reservoir 180, which is monitored by a reservoir pressure sensor 185. In one embodiment, the compressor is a two-stage compressor (such as illustrated in FIG. 2) in which ambient air is compressed in a first stage to a first pressure level and delivered to a second stage, which further compresses the air to a second pressure level that is higher than the first pressure level. The compressed air at the second pressure level is stored in a reservoir. The compressed air may then be provided to one or more pneumatic devices as needed. In other embodiments, the compressor 110 may be a single stage or multi-stage compressor.

The compressor includes a crankcase 160. The crankcase is an enclosure for a crankshaft (not shown in FIG. 1) connected to cylinders (not shown in FIG. 1) of the compressor. A motor 104 (e.g., an electric motor) is employed to rotate the crankshaft to drive the pistons within the cylinders. In another embodiment, the crankshaft may be coupled to a drive shaft of an engine or other power source configured to rotate the crankshaft of the compressor. In each embodiment, the crankshaft may be lubricated with compressor oil that is pumped by an oil pump (not shown) and sprayed onto the crankshaft. The crankshaft is mechanically coupled to a plurality of pistons via respective connecting rods. The pistons are drawn and pushed within their respective cylinders as the crankshaft is rotated to compress a gas in one or more stages.

The rail vehicle further includes a controller 130 for controlling various components related to the vehicle system. In an embodiment, the controller is a computerized control system with a processor 132 and a memory 134. The memory may be computer readable storage media, and may include volatile and/or non-volatile memory storage. In an embodiment, the controller includes multiple control units and the control system may be distributed among each of the control units. In yet another embodiment, a plurality of controllers may cooperate as a single controller interfacing with multiple compressors distributed across a plurality of vehicles. Among other features, the controller may include instructions for enabling on-board monitoring and control of vehicle operation. Stationary applications may also include a controller for managing the operation of one or more compressors and related equipment or machinery.

In an embodiment, the controller receives signals from one or more sensors 150 to monitor operating parameters and operating conditions, and correspondingly adjust actuators 152 to control operation of the rail vehicle and the compressor. In various embodiments, the controller receives signals from one or more sensors corresponding to compressor speed, compressor load, boost pressure, exhaust pressure, ambient pressure, exhaust temperature, or other parameters relating to the operation of the compressor or surrounding system. In another embodiment, the controller receives a signal from a crankcase pressure sensor 170 that corresponds to the pressure within the crankcase. In yet another embodiment, the controller receives a signal from a crankshaft position sensor 172 that indicates a position of the crankshaft. The position of the crankshaft may be identified by the angular displacement of the crankshaft relative to a known location such that the controller is able to determine the position of each piston within its respective cylinder based upon the position of the crankshaft. In some embodiments, the controller controls the vehicle system by sending commands to various components. On a locomotive, for example, such components may include traction motors, alternators, cylinder valves, and throttle controls among others. The controller may be connected to the sensors and actuators through wires that may be bundled together into one or more wiring harnesses to reduce space in vehicle system devoted to wiring and to protect the signal wires from abrasion and vibration. In other embodiments, the controller communicates over a wired or wireless network that may allow for the addition of components without dedicated wiring.

The controller may include onboard electronic diagnostics for recording operational characteristics of the compressor. Operational characteristics may include measurements from sensors associated with the compressor or other components of the system. Such operational characteristics may be stored in a database in memory. In one embodiment, current operational characteristics may be compared to past operational characteristics to determine trends of compressor performance.

The controller may include onboard electronic diagnostics for identifying and recording potential degradation and failures of components of vehicle system. For example, when a potentially degraded component is identified, a diagnostic code may be stored in memory. In one embodiment, a unique diagnostic code may correspond to each type of degradation that may be identified by the controller. For example, a first diagnostic code may indicate a malfunctioning exhaust valve of a cylinder, a second diagnostic code may indicate a malfunctioning intake valve of a cylinder, a third diagnostic code may indicate deterioration of a piston or cylinder resulting in a blow-by condition. Additional diagnostic codes may be defined to indicate other deteriorations or failure modes. In yet other embodiments, diagnostic codes may be generated dynamically to provide information about a detected problem that does not correspond to a predetermined diagnostic code. In some embodiments, the controller modifies the output of charged air from the compressor, such as by reducing the duty cycle of the compressor, based on parameters such as the condition or availability of other compressor systems (such as on adjacent locomotive engines), environmental conditions, and overall pneumatic supply demand.

The controller may be further linked to display 140, such as a diagnostic interface display, providing a user interface to the operating crew and/or a maintenance crew. The controller may control the compressor, in response to operator input via user input controls 142, by sending a command to correspondingly adjust various compressor actuators. Non-limiting examples of user input controls may include a throttle control, a braking control, a keyboard, and a power switch. Further, operational characteristics of the compressor, such as diagnostic codes corresponding to degraded components, may be reported via display to the operator and/or the maintenance crew.

The vehicle system may include a communications system 144 linked to the controller. In one embodiment, communications system may include a radio and an antenna for transmitting and receiving voice and data messages. For example, data communications may be between vehicle system and a control center of a railroad, another locomotive, a satellite, and/or a wayside device, such as a railroad switch. For example, the controller may estimate geographic coordinates of a vehicle system using signals from a GPS receiver. As another example, the controller may transmit operational characteristics of the compressor to the control center via a message transmitted from communications system. In one embodiment, a message may be transmitted to the command center by communications system when a degraded component of the compressor is detected and the vehicle system may be scheduled for maintenance.

As discussed above, the term "loaded" refers to a compressor mode where air is being compressed into the reservoir. The compressor depicted is one which utilizes spring return inlet and discharge valves for each cylinder in which the movement of these valves is caused by the differential pressure across them as opposed to a mechanical coupling to the compressor crank shaft. The subject disclosure may be applicable to machines with either type of valve, but the spring return type will be illustrated here for the sake of brevity.

The controller can be configured to adjust at least one of the following: an operation of the compressor; a scheduled maintenance for the compressor; a maintenance for the compressor; a service for the compressor; a diagnostic code of the compressor; an alert for the compressor; among others. In an embodiment, the controller can be configured to adjust the compressor based upon a detection of a change in pressure for the intermediate stage of the compressor for a duration of time. In a more particular embodiment, the controller can be configured to adjust the compressor based upon a monitored change in pressure of the intermediate stage in combination with a position of a piston of the compressor.

The compressor 110 can include a detection component 128 that can be configured to detect at least one of a pattern, a signature, a level, among others related to a pressure measured within the intermediate stage, wherein such detection is indicative of a condition for the compressor (discussed in more detail below). The detection component and/or the pressure sensor (e.g., pressure sensor 266) can be employed with the compressor to collect data that is indicative of a condition such as a blow-by condition, intake valve deterioration, exhaust valve deterioration, among others. In an embodiment, the controller can be configured to adjust the compressor based upon the detection component and/or the pressure sensor.

The detection component can be a stand-alone component (as depicted), incorporated into the controller component, or a combination thereof. The controller component can be a stand-alone component (as depicted), incorporated into the detection component, or a combination thereof. In another embodiment, the detection component and/or the pressure sensor can be a stand-alone component (as depicted), incorporated into the controller component, or a combination thereof.

FIG. 2 illustrates a detailed view of the compressor set forth in FIG. 1 above. The compressor includes three cylinders 210, 220, 230. Each cylinder contains a piston 218, 228, 238 that is coupled to a crankshaft 250 via connecting rods 240, 242, 244. The crankshaft is driven by the motor to cyclically pull the respective pistons to a Bottom-Dead-Center (BDC) and push the pistons to a Top-Dead-Center (TDC) to output charged air, which is delivered to the reservoir via air lines 280, 282, 284, 286. In this embodiment, the compressor is divided into two stages: a low pressure stage and a high pressure stage to produce charged air in a stepwise approach. The low pressure stage compresses air to a first pressure level which is further compressed by the high pressure stage to a second pressure level. In this example, the low pressure stage includes cylinders 220, 230 and the high pressure stage includes cylinder 210.

In operation, air from the ambient air intake is first drawn into the low pressure cylinders via intake valves 222, 232, which open and close within intake ports 223, 233. The ambient air is drawn in as the low pressure cylinders are pulled towards BDC and the intake valves 222, 232 separate from intake ports 223, 233 to allow air to enter each cylinder 220, 230. Once the pistons reach BDC, the intake valves 222, 232 close the intake ports 223, 233 to contain air within each cylinder. Subsequently, pistons 228, 238 are pushed toward TDC, thereby compressing the ambient air initially drawn into the cylinders. Once the cylinders have compressed the ambient air to a first pressure level, exhaust valves 224, 234 within exhaust ports 225, 235 are opened to release the low pressure air into low pressure lines 280, 282.

The air compressed to a first pressure level is routed to an intermediate stage reservoir 260. The intermediate stage reservoir 260 received air from one stage of a multistage compressor and provides the compressed air to a subsequent stage of a multistage compressor. In an embodiment, the intermediate stage reservoir 260 is a tank or other volume connected between successive stages by air lines. In other embodiments, the air lines, such as low pressure lines 280, 282 provide sufficient volume to function as an intermediate stage reservoir without the need for a tank or other structure.

In an embodiment, the compressor system also includes an intercooler 264 that removes the heat of compression through a substantially constant pressure cooling process. One or more intercoolers may be provided along with one or more intercooler controllers 262. In some embodiments, the intercooler 264 is integrated with the intermediate stage reservoir 260. A decrease in the temperature of the compressed air increases the air density allowing a greater mass to be drawn into the high pressure stage increasing the efficiency of the compressor. The operation of the intercooler is controlled by the intercooler controller 262 to manage the cooling operation. In an embodiment, the intercooler controller 262 employs a thermostatic control through mechanical means such as via thermal expansion of metal. In a multistage compressor system having more than two stages, an intercooler may be provided at each intermediate stage.

The air at a first pressure level (e.g., low pressure air) is exhausted from the intercooler into low pressure air line 284 and subsequently drawn into the high pressure cylinder 210. More particularly, as piston 218 is pulled toward BDC, the intake valve 212 opens, thereby allowing the low pressure air to be drawn into the cylinder 210 via intake port 213. Once the piston 218 reaches BDC, the intake valve 212 closes to seal the low pressure air within the cylinder 210. The piston is then pushed upward thereby compressing the low pressure air into high pressure air. High pressure air is air at a second pressure level greater than the first pressure level, however the amount of compression will vary based upon the requirements of the application. As compression increases, the exhaust valve 214 is opened to allow the high pressure air to exhaust into high pressure line 286 via exhaust port 215. An aftercooler 270 cools the high pressure air to facilitate a greater density to be delivered to the reservoir via high pressure air line 288.

The above process is repeated cyclically as the crankshaft 250 rotates to provide high pressure air to the reservoir 180, which is monitored by the reservoir pressure sensor 185. Once the reservoir reaches a particular pressure level (e.g., 140 psi), the compressor operation is discontinued.

In some embodiments, the compressor includes one or more valves configured to vent compressed air from intermediate stages of the compressor system. The unloader valves and/or relief valves may be operated after compressor operations are discontinued, or may be operated during compressor operations to relieve pressure in the compressor system. In an embodiment, an unloader valve 268 is provided in the intermediate stage reservoir 260 and configured to vent the low pressure compressed air from the intermediate stage reservoir, low pressure air lines 280, 282 and intercooler 264. Venting compressed air reduces stress on system components during periods when the compressor is not in use and may extend the life of the system. In another embodiment, the unloader valve 268 operates as a relief valve to limit the buildup of pressure in the intermediate stage reservoir 260. In yet another embodiment, intake valves 222, 232 operate as unloader valves for the cylinders 220, 230 allowing compressed air in the cylinders to vent back to the ambient air intake 114. In another embodiment, the system 200 can include relief valves such as breather valve 174, a relieve valve on the intercooler 264 (shown in FIG. 4), a relieve valve for air line 286, a rapid unloader valve on the intercooler 264 (shown in FIG. 4)

A compressor, such as the compressor illustrated in FIG. 2, operates to charge the reservoir 180 with compressed air or other gas. Once the compressor charges the reservoir to a determined pressure value the compressor operation is discontinued. In some embodiments, when compressor operations are discontinued, one or more unloader valves are opened to vent intermediate stages of the compressor to the atmosphere. The intake valves of the cylinders as well as unloader valves of the intermediate stage reservoirs may all operate as unloader valves to vent the cylinders of the compressor to the atmosphere. Once the unloader valves are actuated and the cylinders and intermediate stages of the compressor have been vented to the atmosphere the pressure within the reservoir is expected to remain constant as previously discussed.

The compressor 110 can include additional features and/or components that are not illustrated in FIGS. 1 and 2. For instance, the system may include a Control Mag Valve (CMV), a Thermostatically Controlled Intercooler System (TCIS) bypass, a rapid unloader valve, an unloader valve for cylinder 230, an unloader valve for cylinder 220, a relief valve(s), among others.

The crankshaft can include a first end opposite a second end in which the first end is coupled to one or more connecting rods for each respective cylinder. The crankshaft, cylinders, and pistons are illustrated in BDC position based upon the location of the first end. BDC position is a location of the first end at approximately negative ninety degrees (−90 degrees) or 270 degrees. A TDC position is a location of the first end at approximately ninety degrees (90 degrees) or −270 degrees.

As discussed above, the controller can be configured to employ an adjustment to the compressor based upon at least one of a detected change of pressure in the intermediate stage or a detected change of pressure in the intermediate stage associated with a position of a piston. In embodiment, the pressure sensor 266 can monitor a pressure for the intermediate stage with or without identification of a position of a piston. Upon detection of a change in the pressure, the controller can implement an adjustment to the compressor and/or communicate an alert based on the detected change.

In yet another embodiment, a method for a compressor includes operating a compressor to compress air from a first stage compressor into an intermediate stage reservoir, to deliver air from the intermediate stage reservoir to a second stage compressor, and to further compress the air in the second stage compressor into a primary reservoir, monitoring an intermediate stage pressure of the intermediate stage reservoir, and determining a condition of the compressor through recognition of a change in the monitored intermediate stage pressure during a time period in which the compressor is operated. In a two-stage compressor, such as illustrated in FIG. 2, the intermediate stage reservoir 260 is disposed between at least one low pressure cylinder and at least one high pressure cylinder. In some embodiments, the intermediate stage reservoir 260 includes an intercooler 264. The pressure within the intermediate stage reservoir is measured by pressure sensor 266. In operation, a first stage compressor, such as the cylinders 220, 230, compresses air into the intermediate stage reservoir 260 at a first pressure. A second stage compressor, such as the cylinder 210, is configured to receive air from the intermediate stage reservoir at the first pressure and further compress the air into a primary reservoir 180 at a second pressure. During normal operations, the second pressure is greater than the first pressure, and both are greater than the ambient air pressure. In a multi-stage compressor, an intermediate stage reservoir is employed between each successive compression stage at successively increasing pressure levels.

Figure 3:
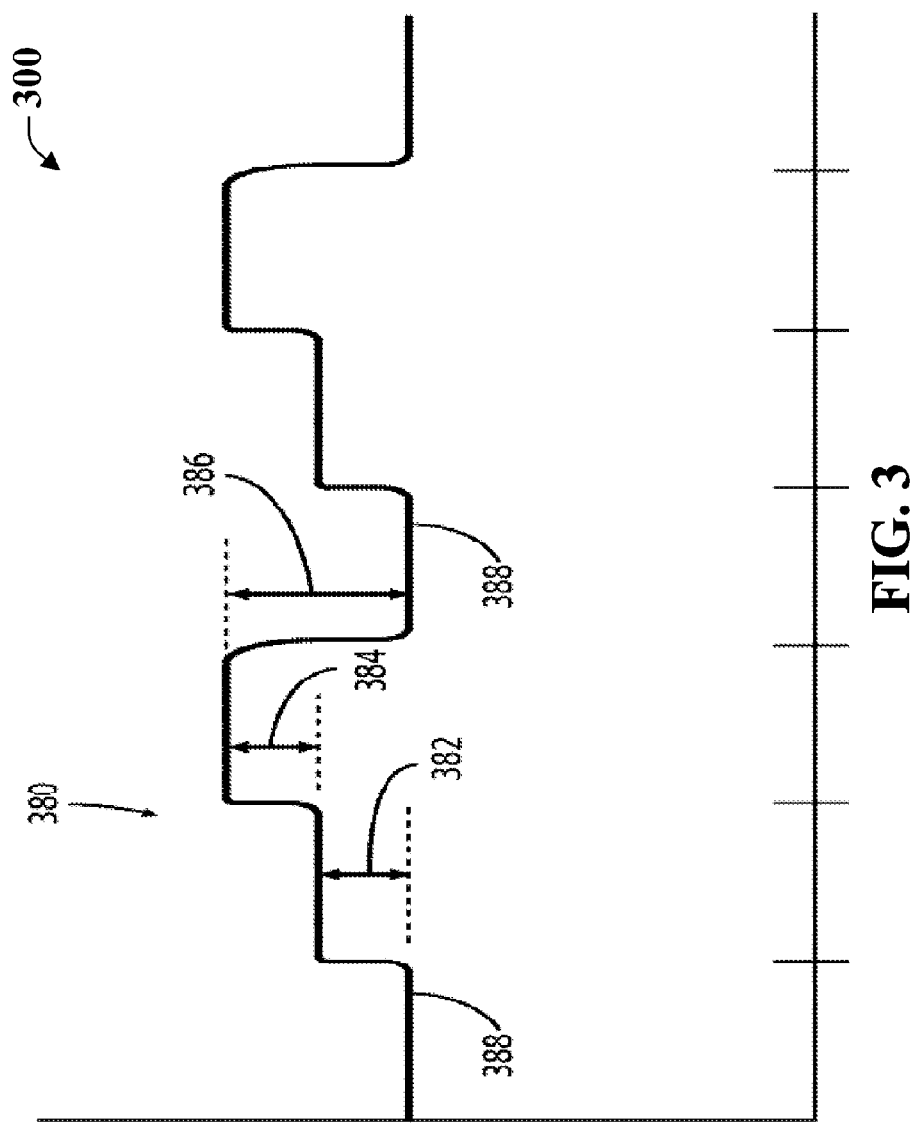
FIG. 3 is a graph that controls a motor based upon a detection component for a compressor.

The pressure in the intermediate stage reservoir 260 is determined by the addition of air from the first stage of the compressor and the removal of air into the second stage of the compressor. Referring now to graph 300 in FIG. 3, an expected pressure 380 of the intermediate stage reservoir 260 of the compressor 110 is illustrated. As shown, the expected pressure increases as the first stage compressor discharges compressed air into the intermediate stage reservoir and the expected pressure decreases when air is drawn from the intermediate stage reservoir into the second stage compressor. Using the compressor 110 of FIG. 2 for illustration, as piston 238 completes a compression stroke in cylinder 230, the intermediate stage reservoir pressure experiences a first increase 382 from the initial pressure level 388. As piston 228 completes its compression stroke in cylinder 220, the intermediate stage reservoir pressure experiences a second increase 384. Finally, during the suction stroke of piston 218 in cylinder 210, the intermediate stage reservoir pressure experiences a decrease 386 as air is drawn out of the intermediate stage reservoir and into cylinder 210. If the increases 382, 384 in pressure match the decrease 386, the intermediate stage reservoir pressure will return to the initial pressure level 388 and the process repeats with each revolution of the compressor.

Various faults in the compressor system affect the measured intermediate stage pressure. In an embodiment, a method of diagnosing a compressor includes determining a condition of a compressor through recognition of a change in the monitored intermediate stage pressure during a time period in which the compressor is operated. During operation, the compressor 110 is operated to fill the primary reservoir 180 with compressed air to a determined pressure value. In many embodiments, the intermediate stage pressure varies in proportion to the reservoir pressure. For example, depending upon the relative compression provided by each stage, the pressure in the intermediate stage reservoir 260 may be approximately 15%, 25% or 50% of the pressure in the primary reservoir 180. Thus as the pressure in the primary reservoir increases, the pressure in the intermediate stage reservoir is expected to increase in proportion. The expected relationship between the average intermediate stage reservoir pressure and the primary reservoir pressure may also be affected by environmental and operating conditions.

In one embodiment, an average of the intermediate stage pressure is calculated and compared to a nominal intermediate stage average pressure, and a fault identified when the average intermediate stage reservoir pressure deviates from the expected value of the nominal intermediate stage average pressure. The nominal intermediate stage average pressure may be determined from environmental conditions, such as ambient air pressure and ambient air temperature. The nominal intermediate stage average pressure may also be determined from operating conditions, such as primary reservoir pressure or compressor speed. In one embodiment, the nominal intermediate stage pressure is a percentage of primary reservoir pressure as previously discussed.

In some embodiments, the nature and magnitude of a compressor fault is determined from the deviation between the average of the intermediate stage pressure and the nominal intermediate stage average pressure. For example, if the average intermediate stage pressure is determined to be above the expected value, the high pressure cylinder 210 may be taking a reduced mass per stroke from the intermediate stage reservoir. When a reduced mass is taken, the decrease 386 is reduced such that the average pressure is increased. Such a condition may be caused by a variety of failure modes. For example, a blow-by condition during the suction stroke of the piston 218 may allow air from the crankcase 160 into the cylinder 210 reducing the mass of air drawn from the intermediate stage reservoir. In another example, failure of the intake valve 212 may inhibit the intake of air into the cylinder 210. In contrast, if the intermediate stage pressure is determined to be below the expected value, the low pressure cylinders 220, 230 may be delivering a reduced mass per stroke to the intermediate stage reservoir. When a reduced mass is delivered the increases 382, 384 are reduced such that the average pressure is reduced. As with high pressure faults, such a condition may be caused by a variety of failure modes. For example, a blow-by condition during the compression stroke of one or more of the pistons 228, 238 may reduce the mass of air delivered to the intermediate stage reservoir as air leaks passed the pistons and into the crankcase 160 as previously discussed. In another example, failure of the exhaust valves 224, 234 may inhibit the discharge of compressed air into the intermediate stage reservoir.

In another embodiment, the monitored intermediate stage pressure is correlated with an indication of a position of a piston in a cylinder of the compressor to further diagnose a fault. The crankshaft position sensor may be used to determine the position of each piston. By correlating the position of each piston with the monitored intermediate stage pressure the impact of each piston can be determined to localize faults. For example, a blow-by condition on either cylinder 220 or cylinder 230 would result in a reduced mass being delivered to the intermediate stage reservoir and a lower than expected average intermediate stage pressure. When the intermediate stage reservoir pressure is correlated with the position of the respective pistons, the piston responsible for the reduced mass may be identified. Using a combination of the average intermediate stage pressure and the correlation between intermediate stage pressure and piston position, the condition of one or more cylinders may be identified to provide detailed information for maintenance and repair operations. Further, a frequency analysis of the intermediate stage pressure may be used to identify frequency components based upon the rate at which the compressor is operated. Deviations from the normal frequency components associated with the periodic impact of each cylinder on the intermediate stage may be identified and correlated with failure modes. The time domain and frequency domain analysis of the intermediate stage pressure may thus provide insight into compressor failures prior to a total failure. In yet another embodiment, the analysis of the intermediate stage reservoir pressure may be combined with the analysis of the monitored crankshaft pressure to further identify leak conditions of individual cylinders. Such methods reduce troubleshooting time and repair costs by providing guidance to maintenance personnel on which components require attention.

In yet another embodiment, a controller is provided to determine (e.g., identify) a condition of a compressor. The controller is configured to receive a signal corresponding to a monitored intermediate stage pressure of the intermediate stage reservoir of the compressor. The controller is further configured to determine a condition of the compressor through recognition of a change in the monitored intermediate stage pressure during a time period in which the compressor is operated. In an embodiment, the controller communicates with one or more intermediate stage pressure sensors 266 and receives the signal corresponding to the monitored intermediate stage pressure from the one or more intermediate stage pressure sensors. The controller may include a processor that analyzes the intermediate stage pressure data as described above. In one embodiment, the controller calculates an average of the intermediate stage pressure over a time period and compares the average intermediate stage pressure over the time period to the nominal intermediate stage average pressure. In another embodiment, the controller correlates the monitored intermediate stage pressure and an indication of a position of a piston in a cylinder of the compressor to further determine the location and nature of an identified fault in one or more of a plurality of cylinders. In yet another embodiment, the controller performs a frequency analysis on the monitored intermediate stage pressure and determines a condition of the compressor based upon the frequency components identified.

The analysis of the intermediate stage pressure may detect faults such as intake or exhaust valve failures, blow-by conditions and other failures of each of the cylinders in the compressor. When a fault is detected, steps may be taken to reduce further damage or wear on the compressor system. In one embodiment, a signal is generated in response to determining a condition of the compressor through recognition of a change in the monitored intermediate stage pressure during a time period in which the compressor is operated. The generated signal may indicate a severity level of the condition based upon the impact of the condition on the intermediate stage pressure. In another embodiment, if the identified condition is severe, the duty cycle of the compressor is reduced in order to reduce further degradation of the compressor until repairs can be made. The duty cycle may be reduced by a fixed amount, such as by 25%, 50% or more, or may be reduced in proportion to the severity of the identified failure. If the leak condition is severe, power to the compressor may be disconnected such that the compressor ceases operating until appropriate repairs have been effected. In another embodiment, personnel are notified by an audio alarm, a visual alarm, a text message, an email, an instant message, a phone call, or other method appropriate for the operating environment. In a system having multiple compressors, in response to a detected leak on one compressor the operation of the other compressors may be adjusted to compensate for the reduced performance of one compressor allowing the system to remain functional until repairs can be scheduled.

In various other embodiments, the aspects of the systems and methods previously described may also be employed individually or in combination to diagnose the condition of a compressor. In one embodiment, a method for diagnosing a compressor includes operating a compressor in an unloaded condition by cycling the pistons within their respective cylinders, monitoring at least the reservoir pressure and the crankcase pressure, and determining a condition of the compressor based on an analysis of both the monitored reservoir pressure and crankcase pressure. In another embodiment, a method for diagnosing a compressor includes operating a multi-stage compressor to charge a reservoir with compressed air, monitoring at least a crankcase pressure and an intermediate stage pressure, and determining a condition of the compressor based on an analysis of both the monitored crankcase pressure and the monitored intermediate stage pressure. In yet another embodiment, a method for diagnosing a compressor includes monitoring signals from at least two of a primary reservoir pressure sensor, an intermediate reservoir pressure sensor, a crankcase pressure sensor, and a crankshaft position sensor, and correlating the monitored signals to identify a failure condition of the compressor. In yet another embodiment, a method of diagnosing a compressor includes actuating an unloader valve, monitoring at least a reservoir pressure sensor and a crankshaft position sensor, and identifying a leak condition of a valve disposed between a cylinder and a reservoir of a compressor. By way of example and not limitation, the subject disclosure can be utilized alone or in combination with a system and/or method disclosed in U.S. Provisional Application Ser. No. 61/636,192, filed Apr. 20, 2012, and entitled "SYSTEM AND METHOD FOR A COMPRESSOR" in which the entirety of the aforementioned application is incorporated herein by reference.

The methods and systems disclosed herein may be applied to a reciprocating compressor having one or more compressor stages, such as the compressor illustrated in FIG. 2. In other embodiments, the methods and systems may be applied to other types of compressors. For example, the compressor may be a diaphragm or membrane compressor in which the compression is produced by movement of a flexible membrane. The compressor may also be a hermetically sealed or semi-hermetically sealed compressor. In addition, the compressor types may include centrifugal compressors, diagonal or mixed flow compressors, axial flow compressors, rotary screw compressors, rotary vane compressors, and scroll compressors, among others.

The methods presently disclosed may also include generating a signal corresponding to the failure condition and alerting an operator or other personnel so that remedial action may be taken. Each of these systems and methods described above may also be implemented on a vehicle system such as the rail vehicle 106 described above. In still yet other embodiments, a test kit is provided that includes a controller having a memory and a processor configured to perform the methods described above.

In each of the embodiments presently disclosed, component fault data may be recorded. In one embodiment, component fault data may be stored in a database including historical compressor data. For example, the database may be stored in memory 134 of controller 130. As another example, the database may be stored at a site remote from rail vehicle 106. For example, historical compressor data may be encapsulated in a message and transmitted with communications system 144. In this manner, a command center may monitor the health of the compressor in real-time. For example, the command center may perform steps to diagnose the condition of the compressor using the compressor data transmitted with communications system 144. For example, the command center may receive compressor data including cylinder pressure data from rail vehicle 106, reservoir pressure, intermediate stage pressure, crankcase pressure, displacement of one or more pistons, and/or movement of the crankshaft to diagnose potential degradation of the compressor. Further, the command center may schedule maintenance and deploy healthy locomotives and maintenance crews in a manner to optimize capital investment. Historical compressor data may be further used to evaluate the health of the compressor before and after compressor service, compressor modifications, and compressor component change-outs.

If a leak or other fault condition exists, further diagnostics and response may be performed. For example, a potential faulty valve condition can be reported to notify appropriate personnel. In an embodiment, reporting is initiated with a signal output to indicate that a fault condition exists. The report is presented via display 140 or a message transmitted with communications system 144, as examples. Once notified, the operator may adjust operation of rail vehicle 106 to reduce the potential of further degradation of the compressor.

In one embodiment, a message indicating a potential fault is transmitted with communications system 144 to a command center. Further, the severity of the potential fault may be reported. For example, diagnosing a fault based on the above described methods may allow a fault to be detected earlier than when the fault is diagnosed with previously available means. In some applications, the compressor is permitted to continue operating when a potential fault is diagnosed in the early stages of degradation. In other applications, the compressor is stopped or maintenance may be promptly scheduled, such as when the potential fault is diagnosed as severe. In this manner the cost of secondary damage to the compressor can be avoided by early and accurate detection.

The severity of the potential fault may be determined based upon an analysis of one or more parameters from one or more diagnostic methods. For example, it may be more desirable to switch off the compressor than to have a degraded cylinder fail in a manner that may cause additional damage to the compressor. In one embodiment, a threshold value or one or more monitored parameters may be determined that indicates continued operation of the compressor is undesirable because the potential fault is severe. As one example, the potential fault may be judged as severe if the leakage of an exhaust valve exceeds a predetermined threshold.

In some embodiments, a request to schedule service is sent, such as by a message sent via communications system 144. Further, by sending the potential fault condition and the severity of the potential fault, down-time of rail vehicle 106 may be reduced. For example, service may be deferred on rail vehicle 106 when the potential fault is of low severity. Down-time may be further reduced by derating power of the compressor, such as by adjusting a compressor operating parameter based on the diagnosed condition.

In yet other embodiments, backup or redundant systems may be available. In an example, backup systems can be evaluated to determine if adequate substitute resources exist to replace the compromised compressor. In some instances, a pre-ordered list of backup systems is used to prioritize the use of backup systems, such as other compressors configured to supply compressed air to pneumatic devices on a plurality of rail vehicles. Various backup systems may be employed including stopping the faulty compressor and receiving charged air from another source. In one example, the other source is a compressor that is disposed on an adjacent locomotive engine. In another example, the other source is a redundant compressor on the same locomotive that is used for this purpose. The backup procedure can be designed to minimize negative system-wide consequences to operation of the locomotive. This is especially true for mission critical systems.

The aforementioned systems, components, (e.g., controller, detection component, among others), and the like have been described with respect to interaction between several components and/or elements. It should be appreciated that such devices and elements can include those elements or sub-elements specified therein, some of the specified elements or sub-elements, and/or additional elements. Further yet, one or more elements and/or sub-elements may be combined into a single component to provide aggregate functionality. The elements may also interact with one or more other elements not specifically described herein.

Figure 4:
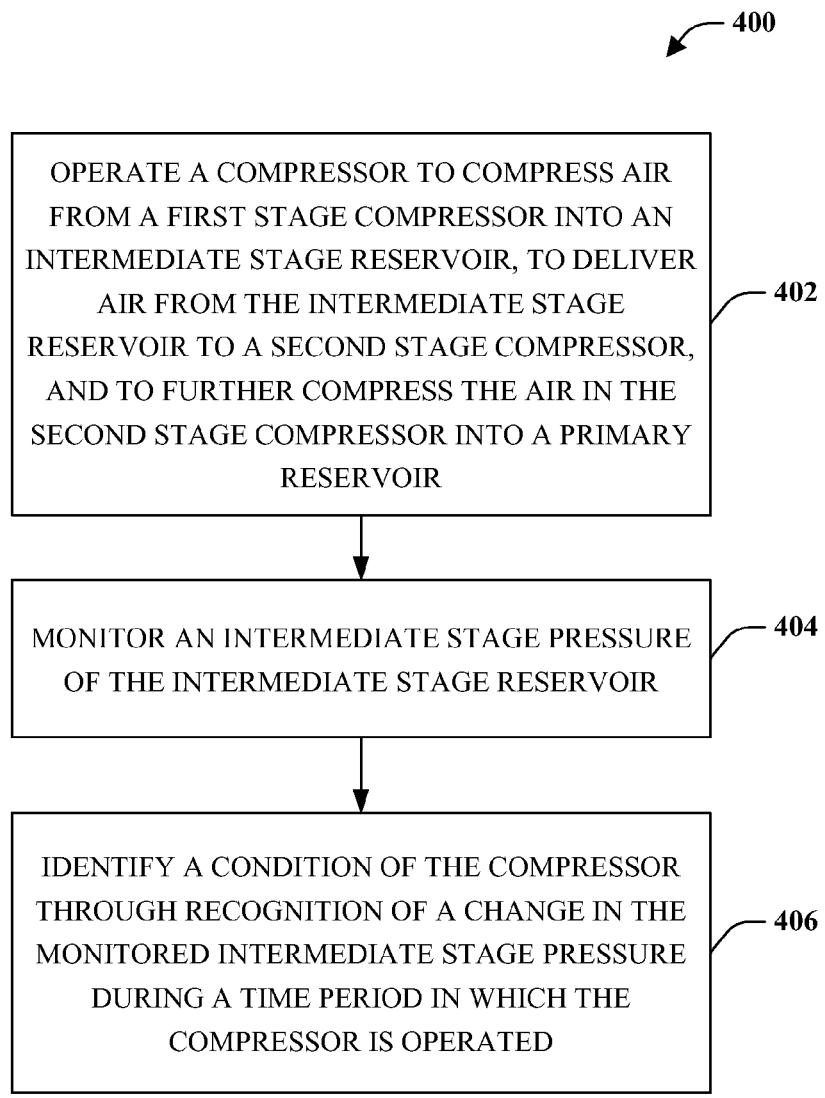
FIG. 4 is a flow chart of an embodiment of a method for monitoring a pressure of an intermediate stage of a compressor to identify a condition thereof.

In view of the exemplary devices and elements described supra, methodologies that may be implemented in accordance with the disclosed subject matter will be better appreciated with reference to the flow chart of FIG. 4. The methodologies are shown and described as a series of blocks, the claimed subject matter is not limited by the order of the blocks, as some blocks may occur in different orders and/or concurrently with other blocks from what is depicted and described herein. Moreover, not all illustrated blocks may be required to implement the methods described hereinafter. The methodologies can be implemented by a component or a portion of a component that includes at least a processor, a memory, and an instruction stored on the memory for the processor to execute.

FIG. 4 illustrates a flow chart of a method 400 for monitoring a pressure of an intermediate stage of a compressor to identify a condition thereof. At reference numeral 402, a compressor can be operated to compress air from a first stage compressor into an intermediate stage reservoir, to deliver air from the intermediate stage reservoir to a second stage compressor, and to further compress the air into the second stage compressor into a primary reservoir. At reference numeral 404, an intermediate stage pressure of the intermediate stage reservoir can be monitored. For instance, the intermediate stage pressure of the compressor can be monitored by the pressure sensor 266 (illustrated in FIG. 2). At reference numeral 406, a condition of the compressor can be identified through recognition of a change in the monitored intermediate stage pressure during a time period in which the compressor is operated.

In an embodiment, a method for a compressor is provided that includes operating a compressor to compress air from a first stage compressor into an intermediate stage reservoir, to deliver air from the intermediate stage reservoir to a second stage compressor, and to further compress the air in the second stage compressor into a primary reservoir; monitoring an intermediate stage pressure of the intermediate stage reservoir; and identifying a condition of the compressor through recognition of a change in the monitored intermediate stage pressure during a time period in which the compressor is operated.

In an embodiment, the method includes filling the primary reservoir with compressed air to a determined pressure value, wherein the reservoir is configured to store compressed air to be provided to at least one pneumatic device. In an embodiment, the method includes identifying a condition of the compressor by correlating the monitored intermediate stage pressure and an indication of a position of a piston in a cylinder of the compressor. In an embodiment, the method includes identifying a condition of one of a plurality of cylinders of the compressor based on the correlation of the intermediate stage pressure and the indication of the position of the piston in the cylinder of the compressor.

In an embodiment, the method includes calculating an average of the intermediate stage pressure over a time period; and comparing the average intermediate stage pressure over the time period to a nominal intermediate stage average pressure. In an embodiment, the method includes determining the nominal intermediate stage average pressure from at least one of ambient air temperature and ambient air pressure. In an embodiment, the method includes identifying the nominal intermediate stage average pressure from at least one of compressor speed, primary reservoir pressure, and oil temperature.

In an embodiment, the method includes identifying a condition of the compressor by identifying a faulty exhaust valve of a low pressure cylinder. In an embodiment, the method includes identifying a condition of the compressor by identifying a piston blow-by condition of at least one cylinder of the compressor. In an embodiment, the method includes identifying a condition of the compressor by identifying an intake valve failure of a high pressure cylinder.

In an embodiment, the method includes generating a signal in response to identify a condition of the compressor through recognition of a change in the monitored intermediate stage pressure during a time period in which the compressor is operated. In an embodiment, the method includes reducing a duty cycle of the compressor in response to identifying a condition of the compressor through recognition of a change in the monitored intermediate stage pressure during a time period in which the compressor is operated. In an embodiment, the method includes notifying personnel via one or more of an audio alarm, a visual alarm, a text message, an email, an instant message, or a phone call in response to determining a condition of the compressor through recognition of a change in the monitored intermediate stage pressure during a time period in which the compressor is operated.

In an embodiment, a controller that is operable to identify a condition of a compressor is provided in which the controller is configured to receive a signal corresponding to a monitored intermediate stage pressure of the intermediate stage reservoir of the compressor; and identify a condition of the compressor through recognition of a change in the monitored intermediate stage pressure during a time period in which the compressor is operated. In an embodiment, the compressor is a two-stage compressor, and wherein the intermediate stage reservoir is disposed between at least one low pressure cylinder and at least one high pressure cylinder. In an embodiment, the controller is further configured to correlate the monitored intermediate stage pressure and an indication of a position of a piston in a cylinder of the compressor. In an embodiment, the controller is further configured to identify a condition of one of a plurality of cylinders of the compressor based on the correlation of the intermediate stage pressure and an indication of a position of a piston in a cylinder of the compressor.

In an embodiment, the controller is further configured to calculate an average of the intermediate stage pressure over a time period; and compare the average intermediate stage pressure over the time period to a nominal intermediate stage average pressure. In an embodiment, the controller is further configured to communicate with one or more intermediate stage pressure sensors and receive the signal corresponding to the monitored intermediate stage pressure from the one or more intermediate stage pressure sensors.

In embodiments, a system is provided in which the system includes an engine; a compressor operatively connected to the engine, wherein the compressor comprises: a first stage compressor configured to compress air into an intermediate stage reservoir at a first pressure, and a second stage compressor configured to receive air from the intermediate stage compressor at the first pressure and further compress the air into a primary reservoir of the compressor at a second pressure, wherein the second pressure is greater than the first pressure; and a controller that is operable to identify a condition of the compressor, wherein the controller is configured to receive a signal corresponding to a monitored intermediate stage pressure of the intermediate stage reservoir of the compressor, and identify a condition of the compressor through recognition of a change in the monitored intermediate stage pressure during a time period in which the compressor is operated.

In embodiments, a compressor system is provided that includes means for operating a compressor to compress air from a first stage compressor into an intermediate stage reservoir, to deliver air from the intermediate stage reservoir to a second stage compressor, and to further compress the air in the second stage compressor into a primary reservoir (for example, the controller 130 can control and compress air within the compressor system); means for monitoring an intermediate stage pressure of the intermediate stage reservoir (for example, the intermediate sensor 266, detection component 128, among others can monitor the intermediate stage pressure); and means for identifying a condition of the compressor through recognition of a change in the monitored intermediate stage pressure during a time period in which the compressor is operated (for example, the controller 130 and/or the detection component 128 can identify the condition of the compressor).

In an embodiment, a compressor is provided that includes at least one intermediate stage reservoir disposed between a first stage compressor and a second stage compressor, wherein the first stage compressor is configured to compress air into the intermediate stage reservoir and the second stage compressor is configured to receive air from the intermediate stage reservoir and further compress the air into a primary reservoir; a pressure sensor configured to measure pressure in the intermediate stage reservoir; and means for identifying a condition of the compressor through recognition of a change in the monitored intermediate stage reservoir pressure during a time period during which the compressor is operated. In an embodiment, the method includes the compressor which can be a two-stage reciprocating compressor, and wherein the first stage compressor comprises at least one low pressure cylinder and the second stage compressor comprises at least on high pressure cylinder. In an embodiment, the compressor further includes a crankcase; a sensor configured to measure pressure in the crankcase of a compressor; and means for identifying a condition of the compressor based on a correlation of the monitored crankcase pressure and an indication of a position of a piston in a cylinder of the compressor.

As used herein, the terms "high pressure" and "low pressure" are relative to one another, that is, a high pressure is higher than a low pressure, and a low pressure is lower than a high pressure. In an air compressor, low pressure may refer to a pressure that is higher than atmospheric pressure, but that is lower than another, higher pressure in the compressor. For example, air at atmospheric pressure may be compressed to a first, low pressure (which is still higher than atmospheric pressure), and further compressed, from the first, low pressure, to a second, high pressure that is higher than the low pressure. An example of a high pressure in a rail vehicle context is 140 psi (965 kPa).

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using a devices or systems and performing incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method for a compressor system, comprising:
   operating the compressor system to compress air from a first stage compressor into an intermediate stage reservoir, to deliver air from the intermediate stage reservoir to a second stage compressor, and to further compress the air in the second stage compressor into a primary reservoir;
   monitoring an intermediate stage pressure of the intermediate stage reservoir; and
   identifying a condition of the compressor system through recognition of a change in the monitored intermediate stage pressure during a time period in which the compressor system is operated relative to a stage of a cycle of the compressor system; and
   generating a control signal in response to identifying the condition of the compressor system, wherein the control signal operates the compressor system or generates an alert.

2. The method of claim 1, further comprising filling the primary reservoir with compressed air to a determined pressure value, wherein the primary reservoir is configured to store compressed air to be provided to at least one pneumatic device.

3. The method of claim 1, wherein identifying the condition of the compressor system further comprises correlating the monitored intermediate stage pressure and an indication of a position of a piston in a cylinder of the compressor system.

4. The method of claim 3, wherein identifying the condition of the compressor system further comprises identifying a condition of the cylinder based on the correlation of the intermediate stage pressure and the indication of the position of the piston in the cylinder of the compressor system.

5. The method of claim 1, wherein the change in the monitored intermediate stage pressure is recognized by:
   calculating an average of the intermediate stage pressure over the time period; and
   comparing the average intermediate stage pressure over the time period to a nominal intermediate stage average pressure.

6. The method of claim 5, further comprising identifying the nominal intermediate stage average pressure from at least one of ambient air temperature or ambient air pressure.

7. The method of claim 5, further comprising identifying the nominal intermediate stage average pressure from at least one of compressor speed, primary reservoir pressure, or oil temperature.

8. The method of claim 1, wherein identifying the condition of the compressor system comprises identifying a faulty exhaust valve of a low pressure cylinder.

9. The method of claim 1, wherein identifying the condition of the compressor system comprises identifying a piston blow-by condition of at least one cylinder of the compressor.

10. The method of claim 1, wherein identifying the condition of the compressor system comprises identifying an intake valve failure of a high pressure cylinder.

11. The method of claim 1, wherein the alert comprises one or more of an audio alarm, a visual alarm, a text message, an email, an instant message, or a phone call.

12. The method of claim 1, wherein the control signal operates the compressor system to reduce a duty cycle of the compressor system.

13. A system comprising:
   a compressor system comprising: a first stage compressor configured to compress air into an intermediate stage reservoir at a first pressure, and a second stage compressor configured to receive air from the intermediate stage reservoir at the first pressure and further compress the air into a primary reservoir of the compressor system at a second pressure, wherein the second pressure is greater than the first pressure; and a controller configured to:

receive a signal corresponding to a monitored intermediate stage pressure of the intermediate stage reservoir of the compressor system; and identify a condition of the compressor system through recognition of a change in the monitored intermediate stage pressure during a time period in which the compressor system is operated relative to a stage of a cycle of the compressor system; and generate a control signal in response to the condition of the compressor system that is identified, wherein the control signal operates the compressor system or generates an alert.

14. The system of claim 13, wherein the compressor system is a two-stage compressor system, and wherein the intermediate stage reservoir is disposed between at least one low pressure cylinder and at least one high pressure cylinder.

15. The system of claim 13, wherein the controller is further configured to recognize the change in the monitored intermediate stage pressure based on the monitored intermediate stage pressure as correlated to an indication of a position of a piston in a cylinder of the compressor system.

16. The system of claim 13, wherein the condition of the compressor system identified is a condition of a cylinder of the compressor system, identified based on a correlation of the intermediate stage pressure to an indication of a position of a piston in the cylinder of the compressor system.

17. The system of claim 13, wherein the controller is further configured to recognize the change in the monitored intermediate stage pressure by:

calculating an average of the intermediate stage pressure over the time period; and comparing the average intermediate stage pressure over the time period to a nominal intermediate stage average pressure.

18. The system of claim 13, wherein the controller is further configured to communicate with one or more intermediate stage pressure sensors and receive the signal corresponding to the monitored intermediate stage pressure from the one or more intermediate stage pressure sensors.

19. The system of claim 13, wherein the condition of the compressor system is a blow-by condition of at least one cylinder of the compressor system.

20. The system of claim 13, wherein the condition of the compressor system is a cylinder valve failure.

21. The system of claim 13, wherein the intermediate stage reservoir comprises an intercooler.

22. The system of claim 13, wherein the controller is configured to generate the control signal for controlling the compressor system to reduce a duty cycle of the compressor system.

23. The system of claim 13, wherein the controller is configured to generate the control signal for generation of the alert, the alert comprising one or more of an audio alarm, a visual alarm, a text message, an email, an instant message, or a phone call.

* * * * *